(12) United States Patent
Krueger et al.

(10) Patent No.: US 9,213,527 B2
(45) Date of Patent: Dec. 15, 2015

(54) MODEL ELEMENTS IN SOFTWARE TOOLS AS AUTOMATONS IN A SOFTWARE CUSTOMIZATION SYSTEM AND METHOD

(71) Applicant: BIGLEVER SOFTWARE, INC., Austin, TX (US)

(72) Inventors: Charles W. Krueger, Austin, TX (US); Glenn C. Meter, Austin, TX (US)

(73) Assignee: BigLever Software, Inc., Austin, TX (US)

( * ) Notice: Subject to any disclaimer, the term of this patent is extended or adjusted under 35 U.S.C. 154(b) by 1 day.

(21) Appl. No.: 13/959,848

(22) Filed: Aug. 6, 2013

(65) Prior Publication Data

US 2013/0318493 A1  Nov. 28, 2013

Related U.S. Application Data

(63) Continuation of application No. 12/115,616, filed on May 6, 2008.

(60) Provisional application No. 60/916,421, filed on May 7, 2007.

(51) Int. Cl.
G06F 9/445 (2006.01)
G06F 9/44 (2006.01)

(52) U.S. Cl.
CPC ... *G06F 8/20* (2013.01); *G06F 8/71* (2013.01)

(58) Field of Classification Search
None
See application file for complete search history.

(56) References Cited

U.S. PATENT DOCUMENTS

2005/0055692 A1\* 3/2005 Lupini et al. .................. 717/174

\* cited by examiner

*Primary Examiner* — Qamrun Nahar
(74) *Attorney, Agent, or Firm* — DuBois, Bryant & Campbell LLP; William D. Wiese

(57) ABSTRACT

Presented is a system and method for the integration of existing software development tools into a software customization system, where each software development tool has its own model of its software artifacts. The invention allows models in an external software development tool to become software artifacts within a software customization system, and also allows the model elements of the existing tools to become automatons.

6 Claims, 4 Drawing Sheets

| Phone | Call Connectivity | Memory | Call Recording | LED Flashlight |
|---|---|---|---|---|
| Low End | Voice | Low | None | Yes |
| Mid Range | Video & Voice | Medium | Voice | No |
| High End | Video & Voice | High | Video & Voice | No |

MODEL ELEMENTS IN SOFTWARE TOOLS AS AUTOMATONS IN A SOFTWARE CUSTOMIZATION SYSTEM AND METHOD

CROSS-REFERENCE TO RELATED APPLICATIONS

The present application is a continuation application of U.S. patent application Ser. No. 12/115,616 filed May 6, 2008 in the name of Charles W. Krueger and Glenn C. Meter, entitled "Model Elements in Software Tools as Automatons in a Software Customization System and Method," which claims priority from and incorporates by reference prior U.S. Provisional Patent Application Ser. No. 60/916,421 filed May 7, 2007 entitled "Model Elements in Software Tools as Variation Points in a Software Customization System and Method".

FIELD OF THE INVENTION

The present invention pertains to the creation of software; more particularly, the present invention pertains to the creation of software for individual products that are part of a product family of similar products using an automated software production line.

BACKGROUND OF THE INVENTION

Mainstream forces in the software engineering industry are driving software product family approaches to take a holistic perspective that is deeply integrated into the system and software engineering lifecycle. These forces demand that software product family engineering solutions focus not on just one stage in the product engineering lifecycle, nor that they focus on multiple, independent and disparate silos in different stages of the lifecycle. The demand from the mainstream is to ease the integration of tools, artifacts and processes across the full system and software product family engineering lifecycle. The goal is to provide product family engineers with a unified set of software product family concepts and constructs for all of their tools and artifacts, at every stage of the lifecycle, and to assure that product family development traceability and processes flow cleanly from one stage of the development lifecycle to another.

Patent pending application Ser. No. 10/106,154 is a software product family engineering method and system that focuses on software artifacts, such as source code modules, that are managed by developers as files and directories. In order for this approach to interoperate with other software development tools that don't present artifacts to the developer as files and directories—such as some requirements management tools, test management tools, model-driven development tools, and so forth—from multiple lifecycle stages, additional support is required. Although it is often possible to find ways of interoperating with these tools and the approach of patent application Ser. No. 10/106,154, for example using data exchange records and translation layers, the result often adds an additional level of indirection that reduces conceptual clarity, is inconvenient, and reduces the simplicity and benefits of the approach. A better approach is needed that extends the benefits of patent application Ser. No. 10/106,154 to support not only software artifacts as data files and directories, but also to uniformly support other types of software artifact model elements present in other software engineering tools across the full software product family engineering lifecycle.

BRIEF SUMMARY OF THE INVENTION

The disclosed system and method enables the effective integration of any software development tool and its associated software artifacts into a software product family engineering system and method. The disclosed system and method provides techniques for creating and managing the collection of variations in the software artifacts that reflect the differences among the individual software products that are part of a software product family.

Each tool can have its own arbitrary model of elements that represent its software artifacts. The disclosed system and method enables any element in a model to become an automaton that serves as a proxy for a real model element that varies between software products within a software product family. This extends existing software product family engineering systems and methods that support software artifacts based on a model of only data files and directories rather than a model of any arbitrary elements.

The disclosed system and method extends the capabilities of software product family engineering systems and methods that provide:

feature variations to uniformly express product diversity among the products in a software product family. For example, optional features or alternate features in the product family;

feature profiles consisting of the selected values for the feature variations associated with a desired product within the software product family;

a file and directory automaton mechanism, where a file or directory automaton serves as a proxy for a real data file or directory that varies between software products within a software product family; and a fully automated product actuator that assembles and configures products in the product family by providing a feature profile to each of the automatons in order to automatically instantiating a real data file in place of a file automaton and a real directory in place of a directory automaton.

With the disclosed system and method, model element automatons are added into the artifact model structure for a software development tool by:

identifying which artifact model elements can become automatons;

defining automaton encapsulations to contain the optional and alternative variability for the automaton, as well as the automaton logic to drive the automaton instantiation; and defining the representation for automaton instantiations.

With the disclosed system and method, capabilities are added to make a software development tool software product family aware:

identifying and displaying automatons;

creating and modifying automatons;

aiding the product actuator in instantiating automatons during automated product instantiation;

displaying the instantiated representation of a automaton, as well as all the uninstantiated variability; and aiding with semantic checks on automatons, impact analysis, statistics, queries and other product family management operations.

The disclosed system and method supplants existing inconvenient techniques such as data exchange and translation layers between an existing software development tool and a software product family development system and method as described above.

With this Integration, product family development organizations benefit from utilizing a consolidated set of software artifacts for the entire product family, first-class model element automatons in software artifacts from any software development tool, and automated production capabilities to automatically instantiate the individual products in a software product family, rather than techniques such as cloned copies of models for each product or building "one-size-fits-all" models for all products. This new level of efficiency enables companies to deliver more new products faster, while reducing the development effort and optimizing product quality.

BRIEF DESCRIPTION OF THE DRAWINGS

FIG. 2 is a diagram showing a handset product family.

FIG. 4 is a diagram showing model element automatons for requirements in a requirements database model.

DETAILED DESCRIPTION

The disclosed system and method expands on the software mass customization system and method as described in patent application Ser. No. 10/106,154, which supported software artifacts based on data files and directories. The disclosed system and method enables the earlier system and method to support software artifacts based on other arbitrary model elements, such as requirements in a requirements management tool database, or Unified Modeling Language (UML) elements in a model-driven development tool. The disclosed system and method enables any element in a model to become an automaton that serves as a proxy for a real model element that varies between software products within a software product family.

Figure 1:
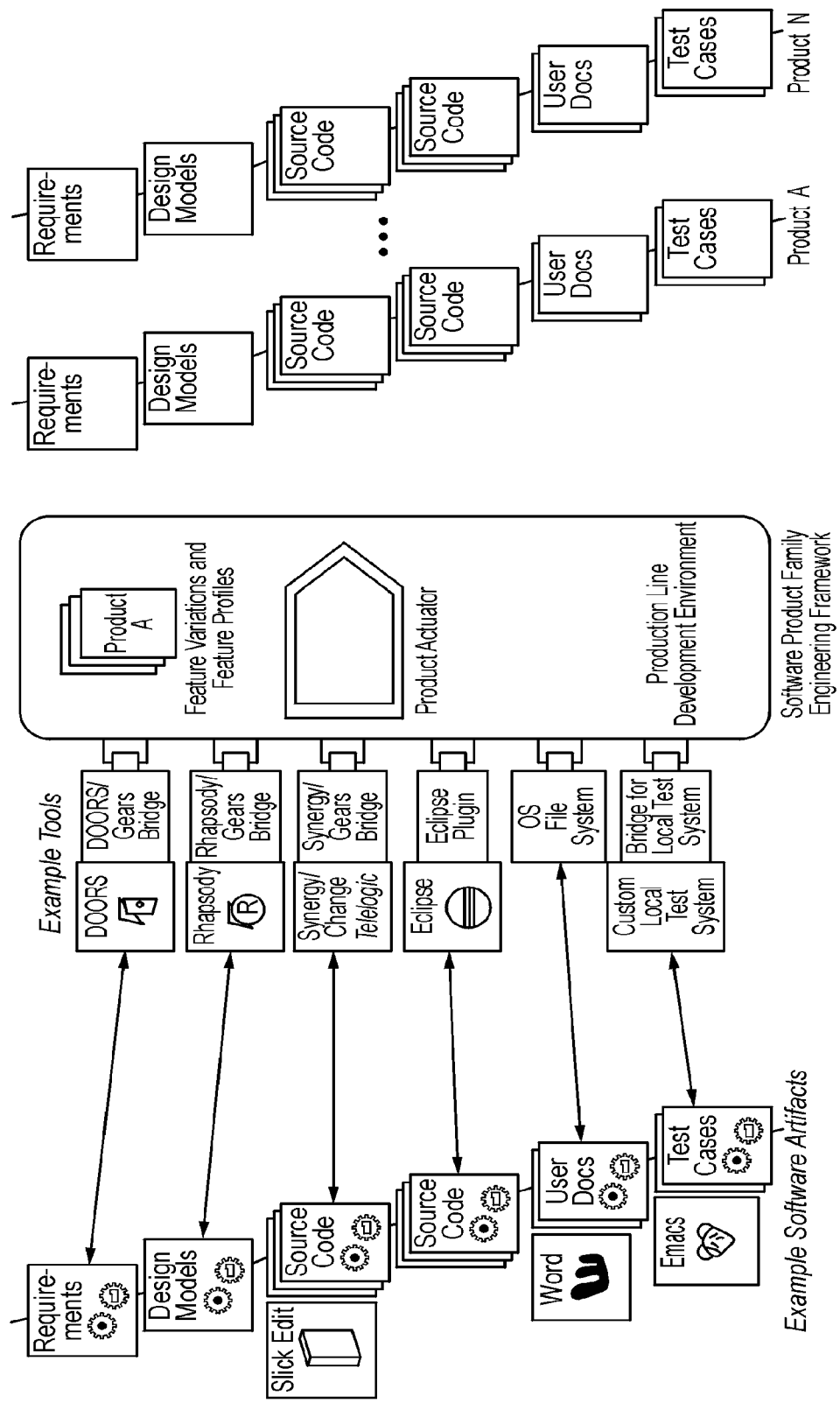
FIG. 1 is a diagram showing an example software product family engineering system.

An example software product family engineering system and method using arbitrary model element automatons is illustrated in FIG. 1.

The core of the software product family engineering system and method is shown as the shaded box in the center of the diagram, referred to as the software product family engineering framework. It contains:

feature variations to uniformly express product diversity among the products in a software product family;

feature profiles consisting of the selected values for the feature variations associated with a desired product within the software product family;

a fully automated product actuator that assembles and configures products in the product family by providing a feature profile to each of the automatons in order to automatically instantiate a real data file in place of a file automaton and a real directory in place of a directory automaton; and production line development environment for developing feature variations and feature profiles, running the product actuator to instantiate products, developing and managing automatons in the software artifacts, and other software product family engineering tasks.

Shown to the left of the framework is an example set of development tools that have been "plugged in" to the framework. Each organization using the software product family engineering framework will have its own preferred set of development tools, so the framework has a tool integration interface. Integration is accomplished by implementing plugin "bridges".

On the far left of the diagram is an example collection of software artifacts for the software product family engineering lifecycle—requirements, design models, source code, user documentation and test cases. The variations within the software artifacts are all implemented using the model element automatons concept disclosed herein. The model element automatons are automatically configured by the framework's product actuator, based on the feature selections in a feature profile.

On the far right of the diagram is a set of product instances that can be produced by the product actuator in the framework. There is a one-to-one correspondence to the feature profiles and the product instances—each feature profile is used by the product actuator to automatically configure the corresponding product instance. Note that all the software artifacts from the full development lifecycle are produced for each of the products in the product line.

The underlying system and method for the framework, such as the actuator, feature profiles and automatons for files and directories, is described in patent application Ser. No. 10/106,154.

To overcome the problem of dissonant software product family engineering concepts, technology, tools and techniques imposing disparate silos in the development lifecycle, the software product family engineering framework is extended to support model element automatons for any software development tool and associated software artifacts, providing a complete solution for the development lifecycle.

Tool Integration

One purpose of tool integrations into the framework is simply to make conventional development tools "software product family aware". This means making a tool aware and capable of working on software artifacts that contain model element automatons rather than merely working on only common model elements for one-of-a-kind applications.

One concept in making any software development tool software product family aware is the model element automaton. Model element automatons are the proxy elements within a software artifact that can be instantiated in different ways by the product actuator, based on feature selections in the feature profiles. For a development tool to be software product family aware, it must be able to:

identify and display automatons;

create and modify automatons;

aid the framework's product actuator in instantiating automatons during product configuration;

display the instantiated representation of a automaton, as well as all the uninstantiated variability; and aid the framework's production line development environment with semantic checks on automatons, impact analysis, statistics, queries and other product family management operations.

Specific characteristics of a tool and its associated software artifacts determine the type of integration that is required. When a tool's artifacts have a text-based representation in the file system, the framework can often provide all the automaton capabilities with file automatons and directory automatons. For example, the development environment in FIG. 1 is using Emacs (lower left) with file and directory automatons, without the need for the disclosed system and methods for model element automatons integration into the framework.

When a tool's software artifacts are maintained in a proprietary internal representation, a deeper two-way integration is often required, where the tool is made software product family aware and the framework is made tool-aware. For example, in FIG. 1, the DOORS requirements management tool uses a database for its proprietary internal representation of requirements, as further described in the examples below. A two-way bridge exists as a dual plugin between DOORS and the software product family engineering framework, to make them mutually aware, so that operations and data can be exchanged to collaboratively perform software product family engineering operations.

The integration bridges are independently installable options in the framework. When an organization transitions to a software product family engineering approach using the software product family engineering framework, they identify preexisting bridges to match their existing toolset and install them into the framework, as in the example in FIG. 1.

Software Artifact Integration

One purpose of asset integration into the software product family engineering framework is to enable conventional one-of-a-kind software artifacts to become reusable and configurable software artifacts. One important aspect to software artifact integration is adding the automaton concept and constructs into the artifact structure:

identify which artifact model elements can become automatons;
define automaton encapsulations to contain the optional and alternative variability for the automaton, as well as the automaton logic to drive the automaton instantiation; and
define the representation for automaton instantiations.

To achieve uniform model element automaton concepts and constructs across all stages of the lifecycle, the automaton implementation in all artifacts must adhere to the automaton meta-model for the framework, as outlined in the three bullets above.

For example, with file and text based source code artifacts in disclosed in patent application Ser. No. 10/106,154, the constructs that became automatons were directories and files. Directories make good automaton encapsulations to hold file and directory variants and automaton logic files. The automaton instantiations were simply files and directories.

In another artifact integration example, automatons in a Unified Modeling Language (UML) model could be any of the UML model elements. For example, in the Telelogic Rhapsody integration, UML "tags" within a model element are used to hold the automaton logic and the optional and alternative variability for the model element. The automaton instantiation for a model element is reflected in the executable code that Rhapsody generates off of a model element automaton.

In another example, in the DOORS requirements integration into the framework, a requirement and its descendants can become a automaton. The instantiation logic for a automaton is contained in a DOORS attribute. For requirements alternatives in a automaton, child requirements are specially tagged as variants for the parent requirement. The automaton instantiation is displayed in a separate database column.

Shared Software Product Family Engineering Concepts and Constructs from the Framework The software product family engineering framework provides a single set of feature variants and a single set of feature profiles that are shared across all the integrated tools and artifacts in a product line. The single product actuator in the framework provides a common instantiation semantics and mechanism for all the integrated tools and artifacts. The framework's software production line development environment provides a single, common administrative and development interface for managing software product family engineering tasks for all the tools and artifacts across the full development lifecycle.

Complete and Consistent End-to-End SPL Lifecycle

The uniformity of concepts and constructs provided by the software product family engineering framework allows traceability and processes to flow cleanly among the different lifecycle stages, without the dissonance created by independent technology in different lifecycle stages.

Traceability

There are three simple heuristics for defining and managing traceability among the artifacts in different stages of the lifecycle.

Traceability among the common parts of the artifacts is managed identical to the way it is managed with one-of-a-kind products. Common requirements trace to common design elements, which trace to common source code elements, and so forth.
Traceability among the automatons in the software artifacts is managed similarly. Automatons in requirements model elements trace to automatons in design model elements, which in turn trace to automatons in source code model elements, and so forth.
If there is a traceability relationship between a common model element in one stage and an automaton in another stage (or vice versa), it is most likely an error in the traceability relationship. This type of traceability consistency analysis can be automated by tools in the framework.

Traceability with the software product family engineering framework is remarkably simple compared to the intractable complexity when trying to define traceability relationships among disparate software product family point solutions in different lifecycle silos.

Process Flow

The flow of software development processes among different lifecycle stages closely mirrors traceability. For example, passing a new set of requirements to an architecture and design team leads to new design models, with traceability relationships between the requirements and design. If the intended traceability in the requirements is difficult to extract and express, then there will be dissonance in the process between the requirements and design stages in the lifecycle.

Thus, the shared software product family concepts and constructs in the different lifecycle stages, plus the simplicity of traceability shown in the previous section translates to simplicity in the process at the lifecycle boundaries.

Furthermore, since the framework feature profiles are shared across all lifecycle stages, artifacts in all stages are constructed under the same software product family engineering feature set. This makes it easier to understand artifacts and their variations in multiple stages when processes depend on it.

OPERATIONAL EXAMPLES

Example 1

Adding Automatons to Unified Modeling Language (UML) Software Artifacts

A simple handset product family is shown in FIG. 2, illustrating by example the integration of a Unified Modeling Language (UML) tool into a software product family engineering framework. This product family comprises three products (the rows in FIG. 2) and four features (the columns in FIG. 2). Each feature column has an enumerated set of choices:

Call Connectivity models the types of phone calls that are support on the handset, Voice only or both Video & Voice;
Memory models three levels of flash RAM that can be configured on the handset, Low, Medium, or High;

Call Recording models the which types of calls can be recorded for replay, None, Voice, or Voice & Video; and LED Flashlight models a boolean choice of whether or not the handset contains a built-in LED flashlight.

The three different product instances have feature profiles that can been seen across the rows:

Low-End handsets are oriented towards developing regions around the world, where low cost is important and intermittent power grids make the flashlight feature valuable;

Mid-Range handsets provide full call connectivity functionality, but the moderate amount of flash RAM makes video call recording impractical; and High-End handsets with the highest configuration of flash RAM can support voice and video call recording.

Rather than using conventional hand-coded source level development to create the software for the handsets, the UML development tool allows the system structures and behaviors to be expressed using the higher level and visually rich abstractions of UML. The firmware source code can then be automatically generated and compiled directly by the tool from the UML models.

The traditional approaches for creating UML models for the three handsets in this product line are:

Clone-and-own. The UML model for one device would be initially created. A copy (clone) of this model would then be made and modified for the next device. Similarly for the third clone. While there is 100% reuse at the time a cloned copy is made, there is 0% subsequent reuse since enhancements and bug fixes must be made repeatedly to each of the three copies; and One-size-fits-all. One UML model would be created for all three handsets. Feature and behavioral variations among the three devices would be managed through runtime variations in the model and controlled by different static configuration settings installed on each device. While this eliminates the need for duplicate model copies, the resulting model can become large and complex to maintain. Furthermore, the large footprint executable needed for the high end device must also fit on the low end device, driving up hardware requirements and cost for the low end device.

Integrating the UML tool into the software product family engineering framework provides the benefits of consolidation offered by the one-size-fits-all approach and the benefits of precise customization offered by the clone-and-own approach, without the associated drawbacks. Referring to FIG. 2, the reusable UML model for the handset product line contains all the feature variations required for the three handsets, encapsulated in automatons. These automatons are automatically configured by the product actuator, based on a feature profile, to produce the precisely customized UML model needed for each of the three handsets.

Figure 3:
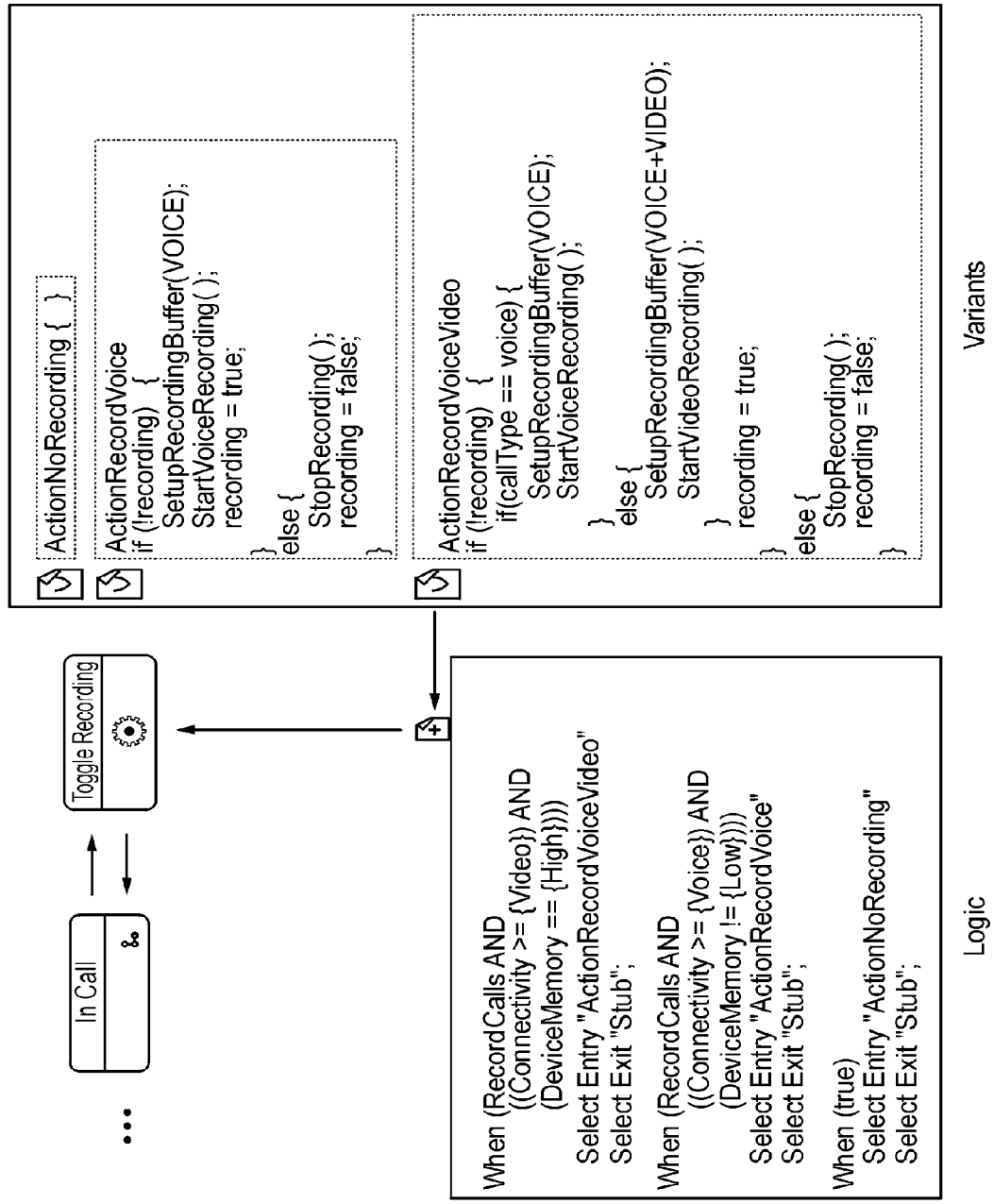
FIG. 3 is a diagram showing the implementation of the toggle recording automatons.

An automaton in a UML model is illustrated in FIG. 3. In the upper-left are two model elements, In Call and Toggle Recording, which are part of an activity diagram for managing the handset call recording feature. In Call is a common model element that is the same in each of the three handset devices. Toggle Recording is a model element automaton, as indicated by the gear annotation, that implements the alternate behaviors needed for the Call Recording feature on the different handsets (see the fourth column in FIG. 2).

The implementation of the Toggle Recording automaton is composed of the two white boxes in FIG. 3, the automaton Variants and the automaton Logic. There are three variants in the source code behavior for the model element, indicated with 'V' icons in the Variants section. These are the three alternate code generation fragments needed by the UML tool to generate the different call recording variants in the handsets:

ActionNoRecording. Empty code variant for when no call recording is supported in handset.

ActionRecordVoice. Model element code fragment for voice-only call recording in handset.

ActionRecordVoiceVideo. Model element code fragment for voice and video call recording in handset.

The automaton Logic is executed by the product actuator to instantiate the Toggle Recording automaton differently for each handset. The When clauses refer to the values in the feature profile for a handset, in order to Select the appropriate Variant based on the feature settings.

When the actuator configures all of the automatons in a UML model to instantiate the firmware for a particular handset, the result is the precise firmware footprint needed for that device—nothing more, nothing less.

Example 2

Adding Automatons to Requirements Database Software Artifacts

Figure 4:
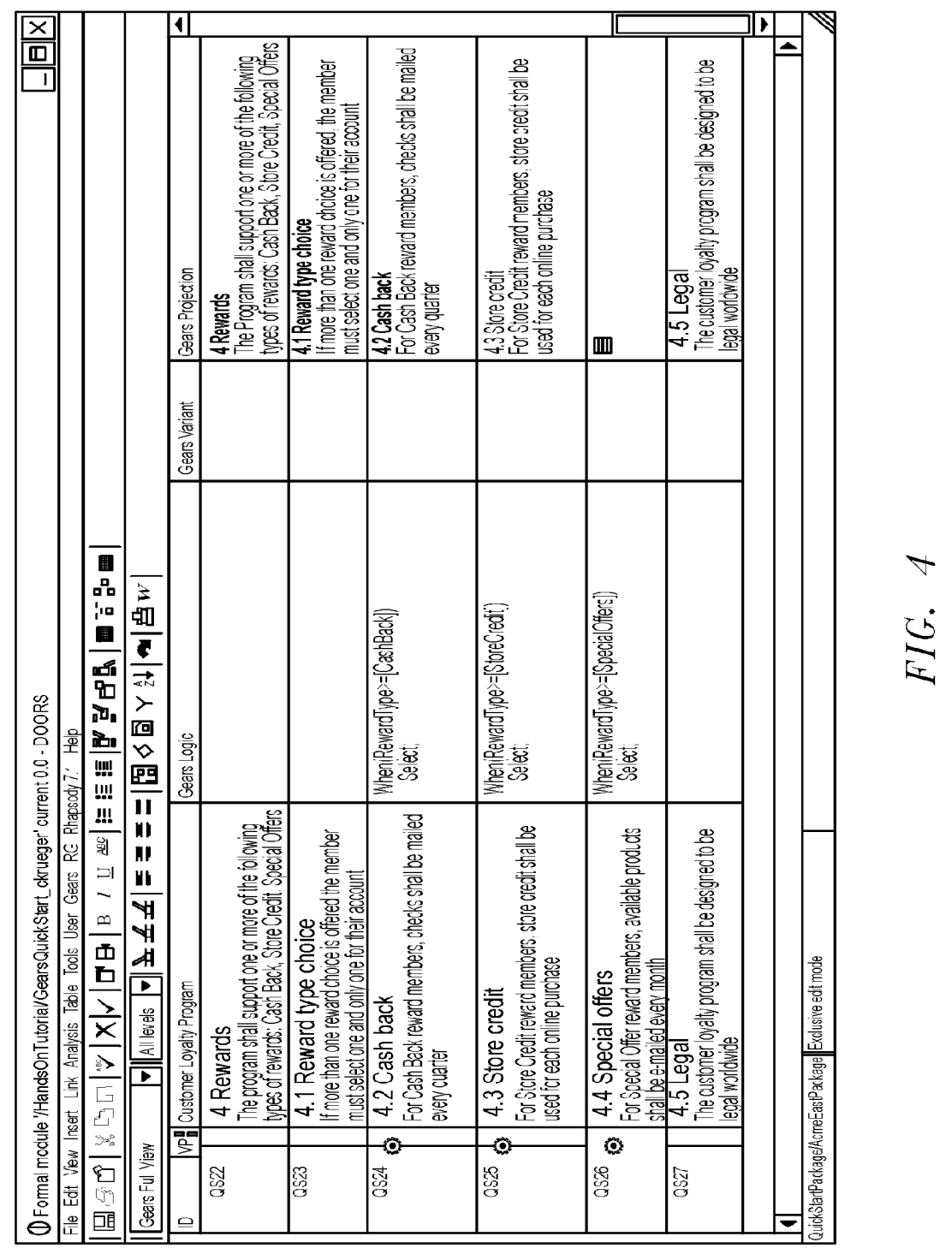

FIG. 4 illustrates model element automatons for requirements in a requirements database model. The example product family in this example is a store customer loyalty program, with different feature variations that can be selected for different styles of customer loyalty programs for different stores.

In FIG. 4, each row in the figure, labeled in the first column as QS22 through QS27, is a model element in the requirements database. The second column, titled VP, indicates whether the requirement is a common model element for all products, or whether it is an automaton that varies from product to product in the product family. Rows with no entry in the VP column in FIG. 4 are common model elements—requirements that are common to all products in the product family. Rows with a gear icon entry in the VP column in FIG. 4 are model element automatons—requirements that differ from product to product in the product family.

For example, requirement 4.1 in row QS23 is a common requirement, because it has no entry in the VP column. This requirement is the same for all products in the product family. Similarly for requirements 4 and 4.5.

For example, requirement 4.2 in row QS24 is a requirement model element automaton, because it has a gear icon entry in the VP column. This requirement is an optional requirement that will be included in some products and not others. Similarly for requirements 4.3 and 4.4.

The automaton logic for a requirement model element automaton is found in the column labeled Gears Logic. For requirements 4.2, 4.3 and 4.4, the logic shows the feature profile selections that will cause each requirement to be included or excluded from a product.

When the product actuator is run using a feature profile for a particular product, the requirements corresponding to that feature profile and product are instantiated in the far right column labeled Gears Projection. For common requirements model elements such as 4, 4.1 and 4.5, the requirements from column 3 labeled Customer Loyalty Program will always be instantiated in the Gears Projection column. For the optional requirements model elements such as 4.2, 4.3 and 4.4, the requirements will only be instantiated if the logic matches the feature selections in the feature profile. In FIG. 4, requirements 4.2 and 4.3 were instantiated during the last actuation, where as requirement 4.4 was not instantiated for the last product actuated, as indicated by the null requirement symbol in the Gears Projection column for row QS26.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The terms "including" and "comprising" are used in an open-ended fashion, and thus should be interpreted to mean "including, but not limited to . . . . "

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible of software products, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for the mass customization of a software artifact, to create one or more variants of said software artifact for different products in a product family, comprising:

a user designing and creating said software artifact via a computerized software engineering tool, said software artifact having common model elements, and said software artifact also having one or more model element automatons, wherein each of said model element automatons serves as a proxy for a real model element that varies between products within a product family; and using a fully automated computerized product actuator to provide a predefined feature profile that specifies the desired features for a variant of said software artifact to each of said model element automatons, thereby automatically instantiating real model elements in place of said model element automatons, to create said variant of said software artifact.

2. The method of claim 1, wherein each of said model element automatons encapsulates data and logic required to be self-configuring with only said feature profile as input.

3. The method of claim 2, wherein said logic and said data reside separately from one another.

4. A method for the mass customization of a software artifact, to create one or more variants of said software artifact for different products, comprising:

a user using a computerized software engineering tool to design and create said software artifact containing one or more model element automatons, wherein each of said model element automatons serves as a proxy for a real model element that varies between products; and specifying desired features for a variant of said software artifact to each of said model element automatons using a fully automated computerized product actuator, thereby automatically instantiating real model elements in place of said model element automatons to create said variant of said software artifact.

5. The method of claim 4, wherein each of said model element automatons encapsulates data and logic required to be self-configuring with only said features as input.

6. The method of claim 5, wherein said logic and said data reside separately from one another.

* * * * *